US004001576B2

United States Statutory Invention Registration [19]

[11] Reg. Number: H1576

Walker, Jr. et al.

[45] Published: Aug. 6, 1996

[54] SOLID POLYMER ELECTROLYTE HAVING AN INCREASED CONDUCTIVITY AND SOLID STATE CELL INCLUDING THE ELECTROLYTE

[75] Inventors: Charles W. Walker, Jr., Neptune; Edward J. Plichta, Howell; Wishvender K. Behl, Ocean, all of N.J.

[73] Assignee: The United States of America as represented by the Secretary of the Army, Washington, D.C.

[21] Appl. No.: 315,213

[22] Filed: Mar. 7, 1994

[51] Int. Cl.[6] ..... H01M 6/16

[52] U.S. Cl. ..... 429/192; 429/190; 429/193; 429/197

[58] Field of Search ..... 429/190, 192, 429/193, 197

[56] References Cited

U.S. PATENT DOCUMENTS

| | | | |
|---|---|---|---|
| 4,247,499 | 1/1981 | Glugla et al. | 429/193 |
| 4,810,599 | 3/1989 | Kondo et al. | 429/193 |
| 4,990,413 | 2/1991 | Lee et al. | 429/193 |
| 5,011,751 | 4/1991 | Yoneyama et al. | 429/192 |
| 5,085,952 | 2/1992 | North | 429/192 |
| 5,219,679 | 6/1993 | Abraham et al. | 429/192 |
| 5,273,847 | 12/1993 | Plichta et al. | 429/193 |
| 5,360,686 | 11/1994 | Peled et al. | 429/191 |

*Primary Examiner*—Charles T. Jordan
*Assistant Examiner*—Meena Chelliah
*Attorney, Agent, or Firm*—Michael Zelenka; Roy E. Gordon

[57] ABSTRACT

A solid polymer electrolyte having an increased conductivity is provided including a solution of at least one lithium salt in at least one polymer host, and wherein said solid polymer electrolyte also includes a dispersion of a lithium ion conducting solid ceramic material. A solid state electrochemical cell including the electrolyte is also provided.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLID POLYMER ELECTROLYTE HAVING AN INCREASED CONDUCTIVITY AND SOLID STATE CELL INCLUDING THE ELECTROLYTE

GOVERNMENT INTEREST

The invention described herein may be manufactured, used, and licensed by or for the Government for governmental purposes without the payment to us of any royalties thereon.

FIELD OF INVENTION

The invention relates to solid polymer electrolytes having an increased conductivity for use in solid state polymer electrolyte batteries, and to solid state batteries including the electrolytes.

BACKGROUND OF THE INVENTION

Solid polymer electrolytes (SPEs) containing dissolved metal salts have been proposed as alternatives to liquid electrolytes in electrochemical systems. There are many advantages to using a solid electrolyte, such as the capability for high speed production of thin cells constructed in a bipolar configuration. Further, the polymer electrolyte can act as a mechanical barrier between the anode and cathode thereby eliminating the need for an inert porous separator as well as acting as a binder/adhesive to move and conform to electrode volume changes during cycling. The polymer electrolytes also allow and facilitate the fabrication of cells in any geometric shape and also provide an inherent safety advantage over liquid electrolytes since there is no liquid component in the cell to leak out if the integrity of the sealed cell is broken.

One of the most commonly used polymer electrolytes is based on high molecular weight polyethylene oxide (PEO). An ionically conducting solid polymer electrolyte can be prepared by dissolving PEO and an appropriate salt such as lithium perchlorate ($LiClO_4$), lithium tetrafluoroborate ($LiBF_4$), lithium trifluoromethanesulfonate ($LiCF_3SO_3$) or lithium hexafluoroarsenate ($LiAsF_6$) in a suitable volatile solvent such as acetonitrile ($CH_3CN$). By solution casting, acetonitrile is removed by evaporation, leaving a free standing solid, flexible film of good mechanical strength that contains only PEO with dissolved salt. Such films are ionic conductors.

However, because of the poor ionic conductivity of these polymers of about $10^{-7}$ S/cm, these polymers are not practical as electrolytes for electrochemical cells and particularly, rechargeable cells.

SUMMARY OF THE INVENTION

The general object of this invention is to provide solid polymer electrolytes having an increased conductivity. A more particular object of the invention is to improve the ionic conductivity of a typical polymer such as PEO with dissolved salt such as $LiClO_4$, $LiBF_4$, $LiCF_3SO_3$ or $LiAsF_6$ so that it can be used as an electrolyte in solid state electrochemical cells.

It has now been found that the aforementioned objects can be attained by incorporating particles of a solid solution of lithium germanium oxide ($Li_4GeO_4$) and lithium vanadium oxide ($Li_3VO_4$) and having the general formula, $Li_{3+x}Ge_xV_{1-x}O_4$, where $0.2<x<0.8$ in the PEO-lithium salt polymer electrolyte.

DESCRIPTION OF THE PREFERRED EMBODIMENT

A solid solution with the composition, $Li_{3.6}Ge_{0.6}V_{0.4}O_4$ is prepared by firing a 2.3 cm pellet of a mixture of 1.33 gms of lithium carbonate, 0.628 gm of germanium oxide and 0.364 gram of vanadium pentoxide that is pressed to a pressure of 6800 kg and placed on a gold foil in a ceramic crucible. The pellet is fired at 600° C. for 20 hours to evolve carbon-dioxide followed by heating to 900° C. for 20 hours. The fired pellet is quenched in air at room temperature and ground to a fine powder and stored in an argon filled dry box having a moisture content of less than 0.5 ppm.

The polymer electrolyte films are prepared by dissolving PEO having an average molecular weight of $4\times10^6$, dried at 50° C. under vacuum overnight and $LiCF_3SO_3$ that has been dried at 50° C. under vacuum in molar ratio of 20:1 respectively in acetonitrile that has been distilled under a stream of dry argon with stirring in an argon filled dry box having a moisture content of less than 5 ppm. Ten weight percent of the lithium ion conducting powdered solid material $Li_{3.6}Ge_{0.6}V_{0.4}O_4$ is then added to this solution with vigorous stirring. Films are cast by pouring the solution into flat Teflon dishes. After the solvent is completely evaporated, free-standing films of 50 to 100 μm in thickness are peeled from the dishes. The conductivity of the film is then measured by placing the film between stainless steel blocking electrodes and measuring the conductivities using the AC impedance technique in the 5 Hz to 100 kHz frequency range with an EG&G PAR Model 388 Electrochemical impedance system.

The conductivity of the PEO-$LiCF_3SO_3$ films prepared with only 10 weight percent lithium ion conducting solid ceramic additive, $Li_{3.6}Ge_{0.6}V_{0.4}O_4$ is found to be 10 times higher than the films prepared without the additive at 40° C. The amount of ceramic material additive contained in the polymer electrolyte may be varied between 0 and 100 weight percent.

When the improved solid polymer electrolyte of the invention is included in an electrochemical cell, either primary, or rechargeable, the anode of such a cell might be lithium metal, lithium alloy, $LiC_6$, lithiated graphite, or lithiated petroleum coke. Similarly, the cathode of such a cell might be $LiCoO_2$, $Ag_2CrO_4$, CuO, $Bi_2O_3$, $Bi_2Pb_2O_5$, $Cr_2O_5$, $Cr_3O_8$, $MnO_2$, $Ni_3S_2$, $TiS_2$, $FeS_2$, $VSe_2$, $NiS_2$, $CoS_2$, $V_6O_{13}$, $V_2O_5$, $LiNiO_2$, $LiMnO_2$, $CuF_2$,$(CF)_n$, $CuCl_2$, AgCl, $Cr_xV_{1-x}S_2$ where x has a value from 0 to 1.

A particular solid state electrochemical cell according to the invention includes lithium as the anode, $LiCoO_2$ on an aluminum foil current collector as the cathode, and $(PEO)_{20}$ ($LiCF_3SO_3$) containing 10 weight percent $Li_{3.6}Ge_{0.6}V_{0.4}O_4$ as the solid polymer electrolyte. The cycling conditions include a temperature of 66° C. and a charge and discharge at 0.01 mA $cm^{-2}$ rate between 4.2–2.4 V. The capacity for cycle 1 is 85.9 $mAhg^{-1}$; for cycle 2 is 74.5 $mAhg^{-1}$; and for cycle 3 is 53.5 $mAhg^{-1}$.

We wish it to be understood that we do not des0ire to be limited to the exact details of construction shown and described for obvious modifications will occur to a person skilled in the art.

What is claimed is:

1. A solid polymer electrolyte for use in an electrochemical cell, said polymer electrolyte including a solution of at least one lithium salt in at least one polymer host and wherein said solid polymer electrolyte also includes a solid solution of lithium germanium oxide and lithium vanadium oxide having the general formula $Li_{3+x}Ge_xV_{1-x}O_4$ where x has a value between 0.2 and 0.8.

2. A solid polymer electrolyte according to claim 1 wherein said lithium salt is selected from the group consisting of lithium perchlorate, lithium tetrafluoroborate, lithium trifluoromethanesulfonate, and lithium hexafluoroarsenate, wherein said polymer host is at least one polymer selected from the group consisting of polyethylene oxide, polyacetylene, poly (alkylthiophene), polyaniline, phenylene, and phenylsulfide, and said lithium ion conducting solid ceramic material is a solid solution of lithium germanium oxide and lithium vanadium oxide having the general formula $Li_{3+x}Ge_xV_{1-x}O_4$ where x has a value between 0.2 and 0.8.

3. A solid polymer electrolyte according to claim 2 wherein said polymer host is polyethylene oxide, said lithium salt is lithium trifluoromethanesulfonate, and said lithium ion conducting solid ceramic material is $Li_{3.6}Ge_{0.6}V_{0.4}O_4$.

4. A solid state electrochemical cell including lithium metal, lithium metal alloys, and lithium intercalating compounds as the anode, an electrochemically active metallic inorganic compound as the cathode, and a solid solution of at least one lithium salt in at least one polymer host as the electrolyte wherein said solid polymer electrolyte also includes a solid solution of lithium germanium oxide and lithium vanadium oxide having the general formula $Li_{3+x}Ge_xV_{1-x}O_4$ where X has a value between 0.2 and 0.8.

5. A solid state electrochemical cell including a compound selected from the group consisting of lithium metal, lithium metal alloy, $LiC_6$, lithiated graphite and lithiated petroleum coke as the anode, a compound selected from the group consisting of $LiCoO_2$, $Ag_2CrO_4$, CuO, $Bi_2O_3$, $Bi_2Pb_2O_5$, $Cr_2O_5$, $Cr_3O_8$, $MnO_2$, $Ni_3S_2$, $TiS_2$, $FeS_2$, $VSe_2$, $NiS_2$, $CoS_2$, $V_6O_{13}$, $V_2O_5$, $LiNiO_2$, $LiMnO_2$, $CuF_2$,$(CF)_n$, $CuCl_2$, AgCl, and $Cr_xV_{1-x}S_2$ where x has a value of 0 to 1 as the cathode, and a solid solution of at least one lithium salt selected from the group consisting of lithium perchlorate, lithium tetrafluoroborate, lithium trifluoromethanesulfonate, and lithium hexafluoroarsenate in at least one polymer host selected from the group consisting of polyethylene oxide, polyacetylene poly(alkylthiophene), polyaniline, phenylene, and phenylsulfide as the solid polymer electrolyte and wherein said solid polymer electrolyte also includes a dispersion of a lithium ion conducting solid ceramic material including a solid solution of lithium germanium oxide and lithium vanadium oxide having the general formula $Li_{3+x}Ge_xV_{1-x}O_4$ where x has a value between 0.2 and 0.8.

6. A solid state electrochemical cell according to claim 5 wherein the anode is lithium, the cathode is $LiCoO_2$, the polymer host is polyethylene oxide, the lithium salt is trifluoromethanesulfonate, and the lithium ion conducting solid ceramic material is $Li_{3.6}Ge_{0.6}V_{0.4}O_4$.

* * * * *